United States Patent [19]
Sun et al.

[11] Patent Number: 6,159,076
[45] Date of Patent: Dec. 12, 2000

[54] SLURRY COMPRISING A LIGAND OR CHELATING AGENT FOR POLISHING A SURFACE

[75] Inventors: Li Zhong Sun, Fremont; Stanley M. Smith, San Jose; Curtis W. Fouyer, Milpitas, all of Calif.

[73] Assignee: Komag, Inc., San Jose, Calif.

[21] Appl. No.: 09/085,764

[22] Filed: May 28, 1998

[51] Int. Cl.$^7$ .................................................. B24B 1/00
[52] U.S. Cl. ............................................. 451/36; 451/41
[58] Field of Search ................................ 451/41, 36, 285, 451/287, 288

[56] References Cited

U.S. PATENT DOCUMENTS

| | | |
|---|---|---|
| 3,385,682 | 5/1968 | Lowen . |
| 4,705,566 | 11/1987 | Senda et al. . |
| 4,769,046 | 9/1988 | Senda et al. . |
| 4,954,142 | 9/1990 | Carr et al. ................................. 51/309 |
| 4,959,113 | 9/1990 | Roberts . |
| 5,167,096 | 12/1992 | Eltoukhy et al. . |
| 5,225,034 | 7/1993 | Yu et al. . |
| 5,230,833 | 7/1993 | Romberger et al. . |
| 5,246,624 | 9/1993 | Miller et al. . |
| 5,340,370 | 8/1994 | Cadien et al. . |
| 5,352,277 | 10/1994 | Sasaki . |
| 5,366,542 | 11/1994 | Yamada et al. ............................. 106/3 |
| 5,571,373 | 11/1996 | Krishna et al. . |
| 5,575,837 | 11/1996 | Kodama et al. . |
| 5,643,837 | 7/1997 | Hayashi . |
| 5,658,659 | 8/1997 | Chen et al. . |
| 5,700,383 | 12/1997 | Feller et al. ............................. 216/88 |
| 5,709,588 | 1/1998 | Muroyama ................................. 451/41 |
| 5,738,800 | 4/1998 | Hosali et al. ............................. 216/99 |
| 5,759,917 | 6/1998 | Grover et al. . |
| 5,783,489 | 7/1998 | Kaufman et al. ........................ 438/692 |
| 5,804,513 | 9/1998 | Sakatani et al. . |
| 5,858,813 | 1/1999 | Scherber et al. ........................ 438/693 |
| 5,916,819 | 6/1999 | Skrovan et al. ........................ 438/692 |
| 5,935,278 | 8/1999 | Ishitobi et al. . |

OTHER PUBLICATIONS

I. Ali et al., "Charged Particle in Process Liquids", Semiconductor International, Apr. 1990, pp. 92–96.

Carpio, R. et al. "Initial Study on Copper CMP Slurry Chemistries" *Thin Solid Films,* 1995, pp. 238–244.

Sabde, G.M. "Slurry Development for Chemical Mechanical Polishing of Tungsten", CMP–MIC Conference, 1997, pp. 331–334.

Pohl, M., et al., "The Importance of Particle Size to the Performance of Abrasive Particles in the CMP Process", Journal of Electronic Materials, vol. 25, Nov. 10, 1996, pp. 1612–1616.

Material Safety Data Sheet, 1996.

Vander Voort, G.F., "Polishing with Colloidal Silica", 1997 pp. 1–13.

Niernynck, J.M., et al., "The Addition of Surfactant to Slurry for Polymer CMP: Effects on Polymer Surface, Removal Rate and Underlying Cu", *Thin Solid Films,* 1996 pp. 447–452.

Talke, F., "On Tribological Problems in Magnetic Disk Recording Technology", UCSD, Center for Magnetic Recording Research, pp. 18–25.

Hu, Z.Y. et al., "Chemical–Mechanical Polishing of PECVD Silicon Nitride", *Thin Solid Films,* 1996, pp. 453–457/.

Ali, I., et al., "Chemical–Mechanical Polishing of Interlayer Dielectric: A Review", Solid State Technology, Oct. 1994, pp. 62–70.

*Primary Examiner*—David A. Scherbel
*Assistant Examiner*—Dung Van Nguyen
*Attorney, Agent, or Firm*—Keith G. Askoff

[57] ABSTRACT

A novel slurry for polishing and a method of polishing using a slurry is disclosed. The slurry may include a colloidal silica abrasive in an aqueous solution. The slurry further includes a chelating agent that is believed to remove adsorbed ions from the surface of the layer being polished. The method may be used to polish a surface comprising, for example nickel and the chelating agent may be, for example, ammonium oxalate.

24 Claims, 5 Drawing Sheets

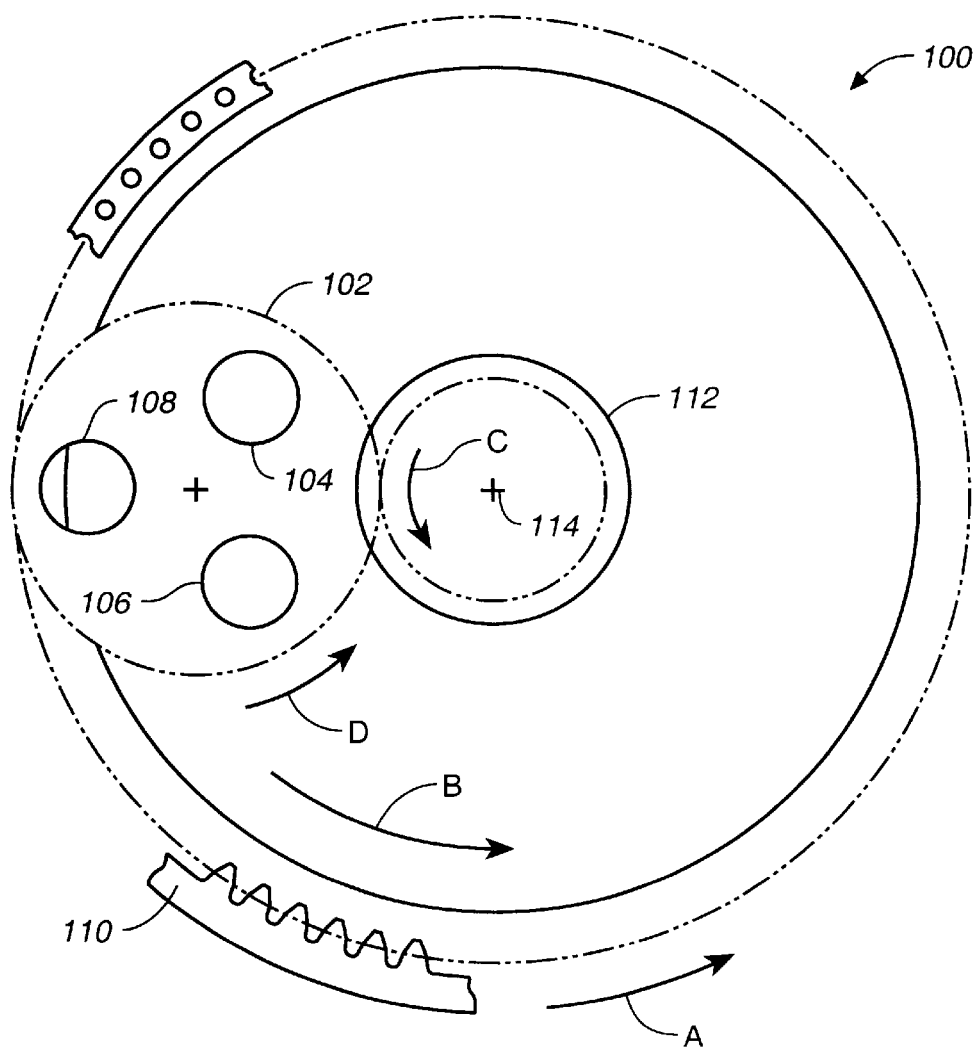
FIG._1A (PRIOR ART)
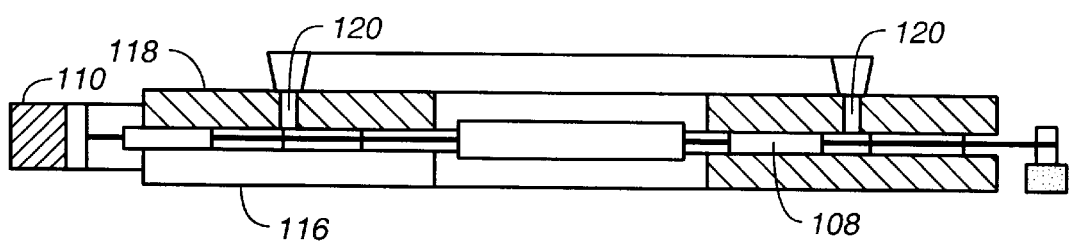
FIG._1B (PRIOR ART)

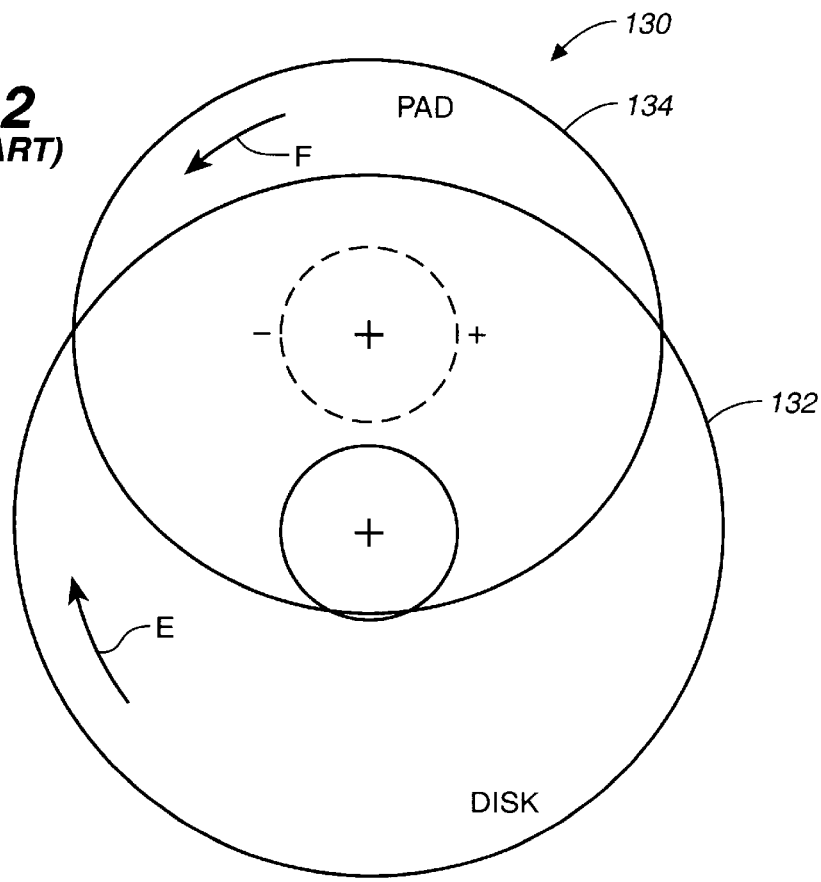
FIG._2
*(PRIOR ART)*
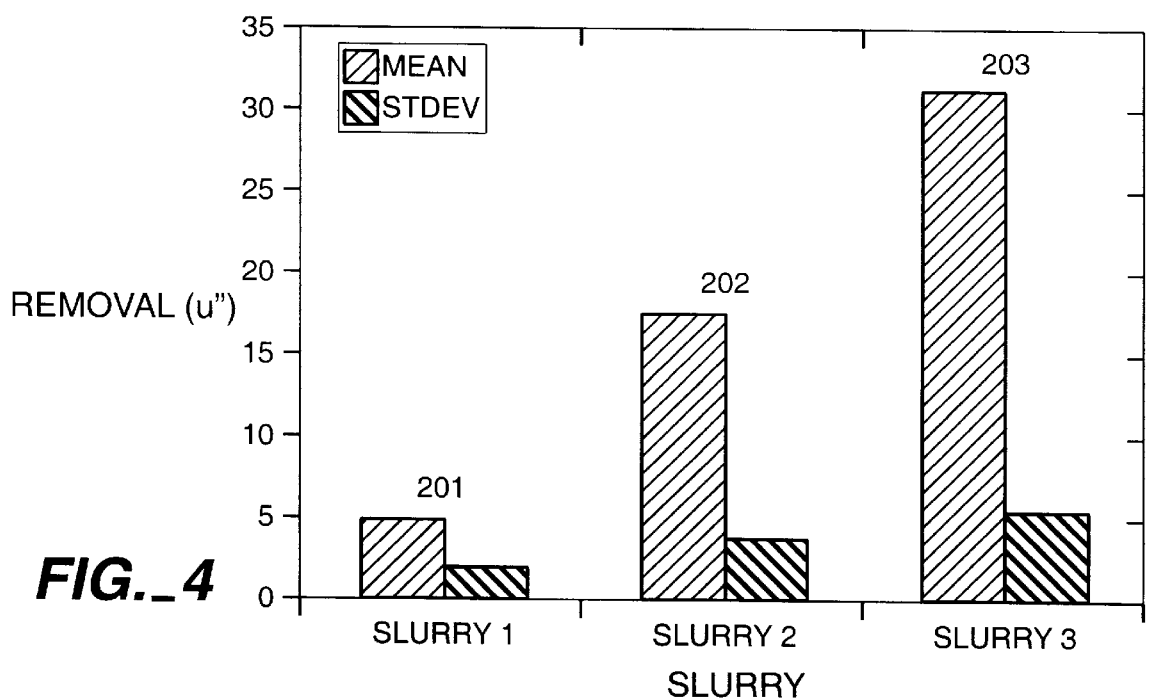
FIG._4

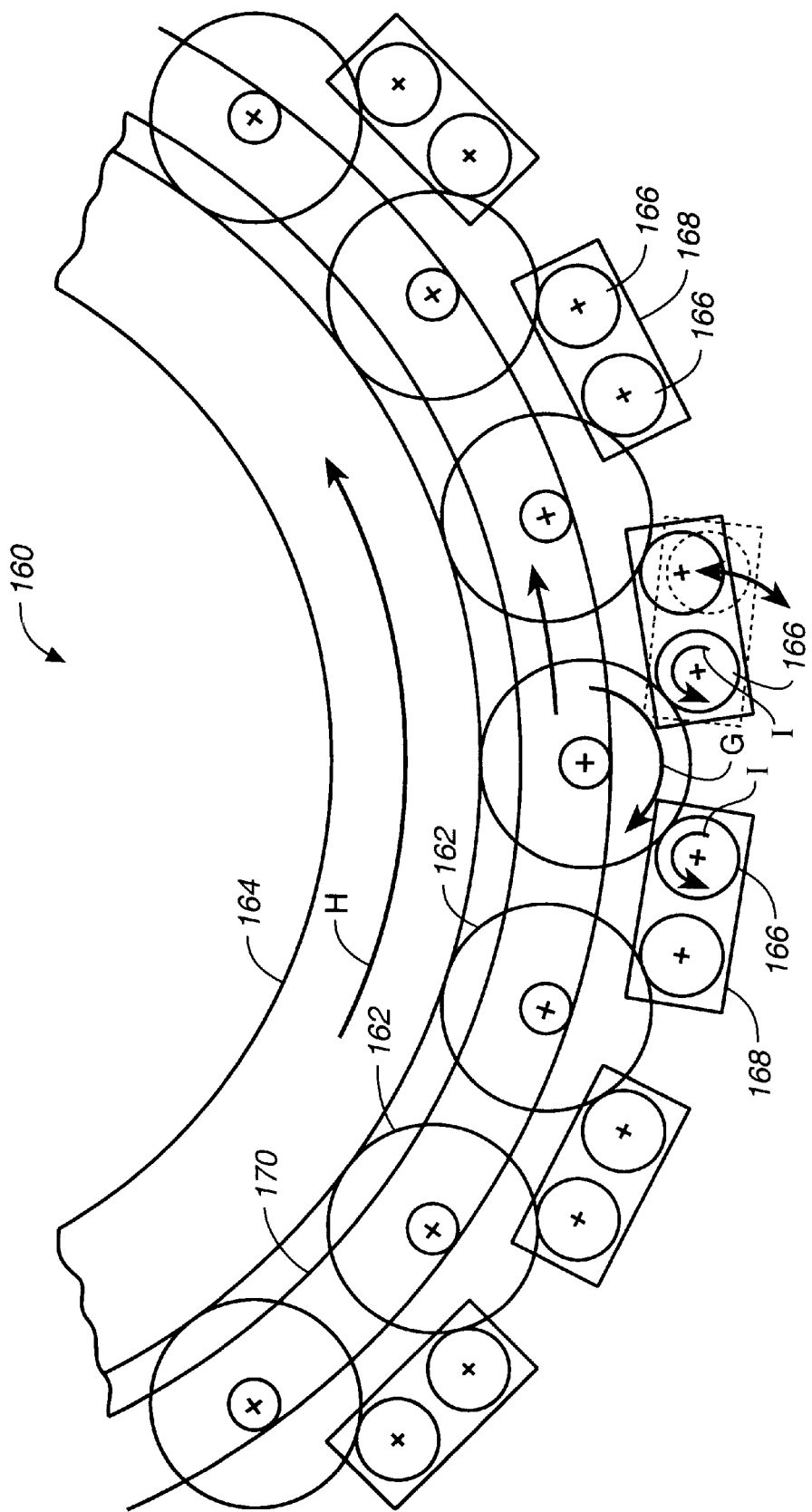
FIG._3 (PRIOR ART)

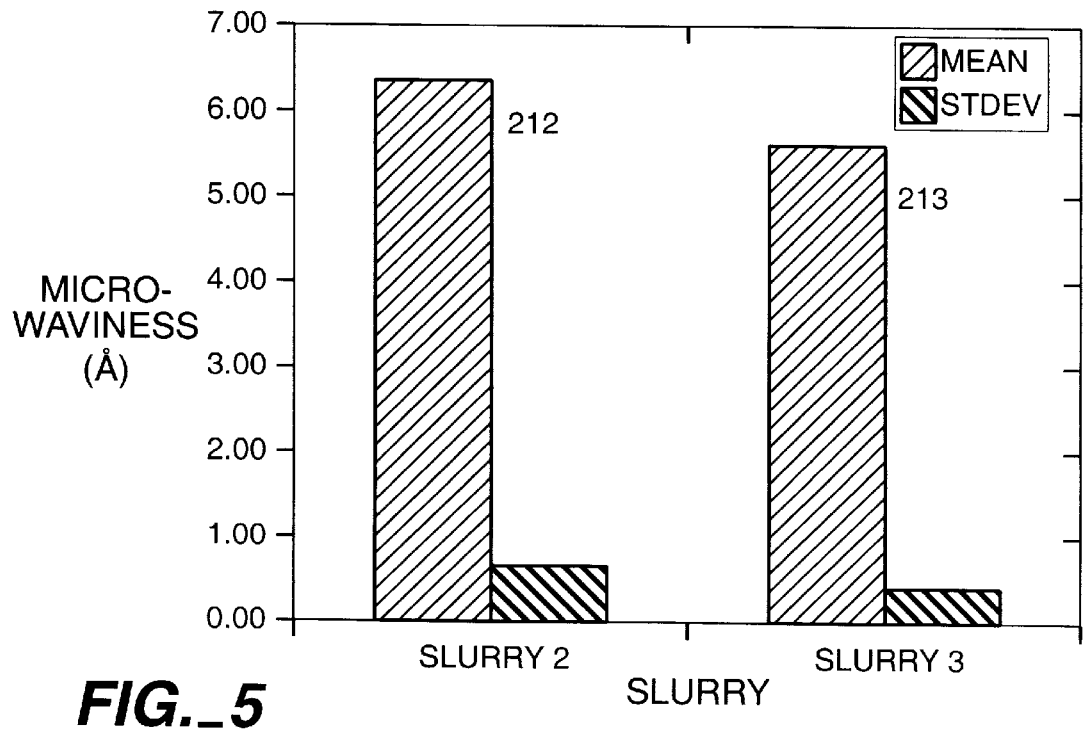
FIG._5
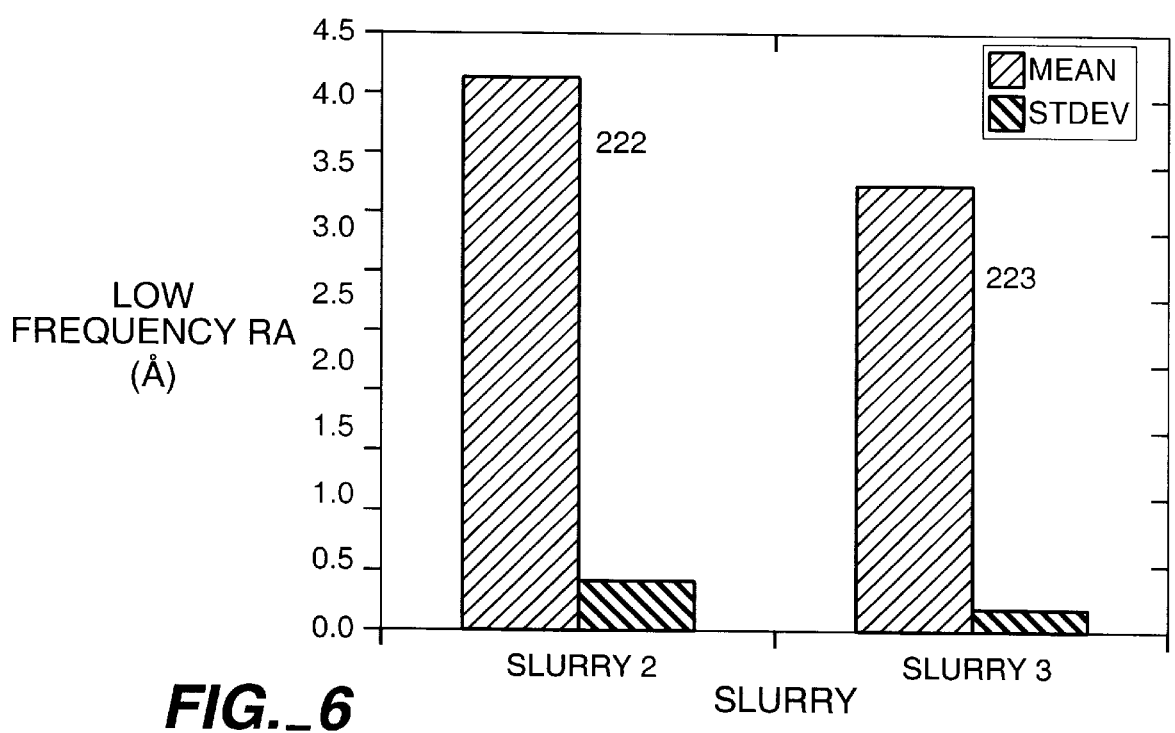
FIG._6

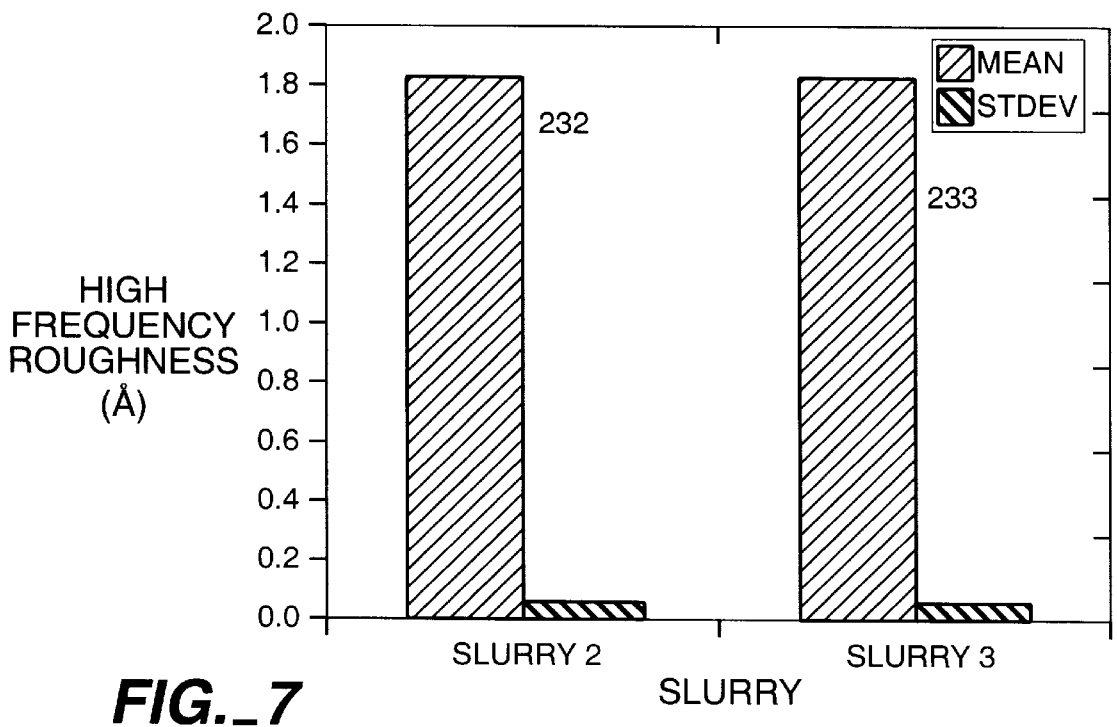
FIG._7
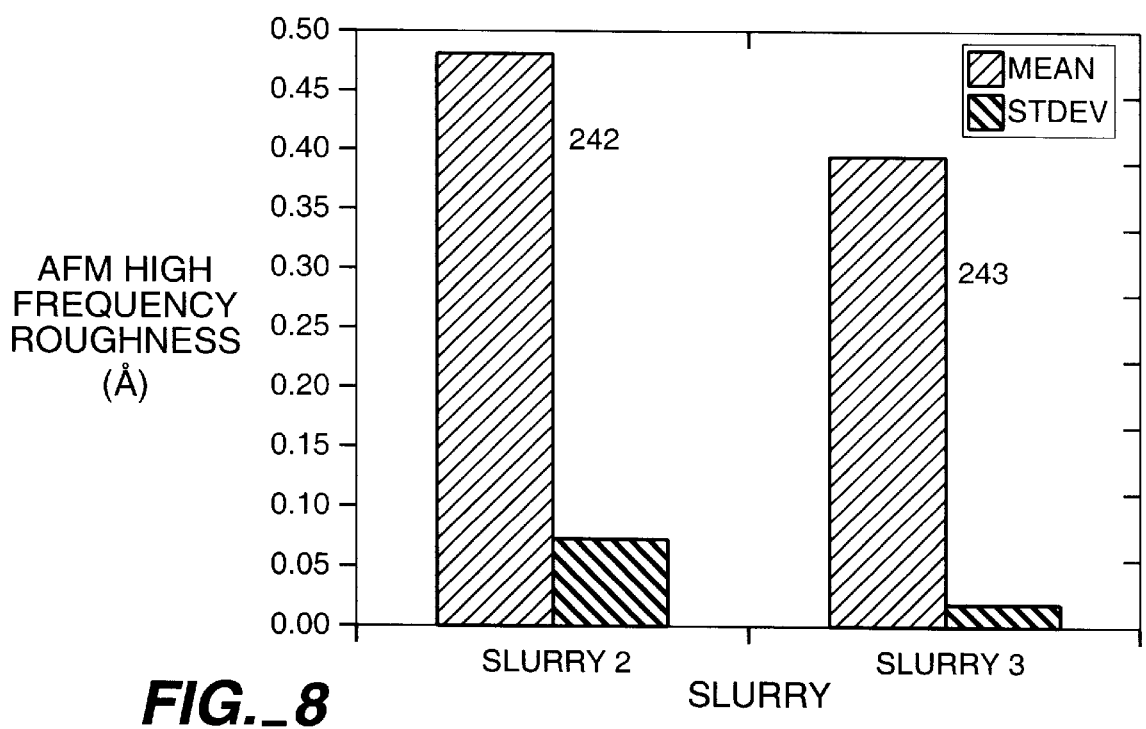
FIG._8

SLURRY COMPRISING A LIGAND OR CHELATING AGENT FOR POLISHING A SURFACE

FIELD OF THE INVENTION

This invention relates to the formulation of a colloidal slurry used to polish e.g. Ni plated substrates. This formulation significantly increases the material removal rate during polishing, reduces polish defects, and improves the polished surface finish.

BACKGROUND OF THE INVENTION

A metallic magnetic thin film disk used in a computer disk drive typically comprises a substrate made of aluminum, glass, glass-ceramic or other similar materials plated with a nickel compound such as NiP, NiU, NiNb, NiAl or other nickel compound typically 50% or greater atomic percent Ni (referred to generally as a Ni layer herein), underlayers sputtered onto the plated Ni, one or more magnetic cobalt alloy layers sputtered onto the underlayer, a carbon protective overcoat sputtered onto the magnetic layer(s) and one or more lubricant layer(s) deposited on the carbon.

Before depositing the underlayer, the plated Ni layer is polished to remove surface defects and to lower surface roughness which strongly affects the flying height of a recording head over the disk.

In current and future disks, a smoother polished NiP surface with fewer polish defects is required. At present, the lowest surface roughness Ra obtained using commercially available slurries for Ni plated substrate polishing is about 0.5 nm. ("Ra" is a well-known measure of surface roughness.) However, polishing defects become severe problems as the polished surface roughness is lowered. Two kinds of polish defects, micro-scratches and polish pits, are apt to form on the Ni polished surface. In general, micro-scratches are thought to be caused by large agglomerated particles. Polish pits are formed either by chemical attack or other unknown causes.

One type of commercially available slurry used for polishing NiP plated substrates typically comprises two components: alumina abrasive particles and an acidic etchant. The abrasive particle size ranges from about 0.1 $\mu$m to 1 $\mu$m. The slurry pH typically ranges from 2 to 6 for various polish process applications. Polishing with these slurries is based on micro-machining, wherein the abrasive has an angular shape and grinds the surface. The acidic etchant helps increase the efficiency of the micro-machining and improves the polished surface finish by chemical etching. Although a smoother polished surface can be obtained by using smaller abrasive particles, it is still not possible to make scratch-free polished surfaces because of the greater hardness of the alumina abrasive compared with the hardness of the surface. Further, these conventional slurries are apt to cause polish pits.

In order to eliminate the above-mentioned problems of conventional slurries, colloidal silica has been considered for polishing NiP plated substrates. Colloidal silica has long been successfully used for polishing various materials, such as silicon, gallium arsenide, indium phosphide and titanium, to form a super-smooth and scratch-free surface finish. In general, colloidal silica is softer, rounder and smaller than abrasives such as alumina, thus allowing colloidal silica to provide the super smooth and scratch free surface. However, because of these properties, the mechanical grinding action of colloidal silicas is less aggressive than other abrasives, thus leading to a typically lower material removal rate.

Various kinds of chemicals are used in colloidal silica slurries for different polishing applications to achieve either an increased material removal rate or better polished surface finishes with fewer polish defects. Alkaline chemicals, for instance, are used as etchants in colloidal silica slurries to reduce surface roughness in semiconductor wafer rough polish processes as described in U.S. Pat. No. 5,571,373 issued Nov. 5, 1996 to Krishna et al., incorporated herein by reference. Persulphate, as described in U.S. Pat. No. 5,575,837 issued Nov. 19, 1996 to Kodama et al., is used as an etchant in a colloidal silica slurry for mirror-finishing metal surfaces.

Unfortunately, several problems are encountered when attempting to use these commercially available colloidal silica slurries to polish Ni plated substrates. For example, existing commercial colloidal silica slurries, either with an alkaline etchant or an acidic etchant, exhibit a very low Ni removal rate. Further, these slurries also cause polish pits, which are caused by chemical attacking, and micro-scratches. There is presently no adequate colloidal silica formulation for polishing NiP.

To make a colloidal silica slurry applicable to NiP plated substrate polishing, a new formulation is desired to increase slurry's NiP removal rate and to decrease polish defects. It is known in the art that adding an oxidizer or changing chemistry can increase the material removal rate or remove polish defects. However, the extent to which one can add an oxidizer or change the slurry chemistry is bounded by colloidal chemistry as described by I. Ali et al. in "Charged Particles in Process Liquids", Semiconductor Intl., pp. 92–95, Apr. 1990. The colloidal suspension may be broken or the aqueous colloidal abrasive can jell due to the pH value change caused by oxidizer addition or other chemistry change. A colloidal silica slurry having an increased material removal rate as described in co-pending U.S. patent application Ser. No. 08/965,099, which application is assigned to the assignee of the present invention and which application is hereby incorporated by reference.

The slurry described in the above-mentioned application showed an increased Ni removal rate and a reduced number of polish defects, and simultaneously provided a good polished surface finish. It would be desirable to provide a slurry that further improves the removal rate while maintaining or improving upon the number of defects and the polished surface finish.

SUMMARY OF THE INVENTION

In one embodiment of the invention, a ligand of a constituent of the surface to be polished is added to a colloidal silica polishing slurry to significantly increase the material removal rate, and to provide reduced polish defects, and decreased polished surface roughness. The slurry is used to polish surfaces comprising, for example Ni, Al, Ni or Al compounds or alloys, or other metals.

In a further embodiment of the invention, the ligand is provided by a compound that is a chelating agent for a constituent of the surface.

In a further embodiment of the invention, the slurry comprises a dicarboxylate such as an oxalate, malonate, succinate, maleate, and phthalate.

In a further embodiment of the invention, the above described formulations can be used in slurries containing other abrasives including fumed silica and alumina, for example.

BRIEF DESCRIPTION OF THE DRAWINGS

FIGS. 1A and 1B schematically show a planetary polishing apparatus in plan view and cross section, respectively.

FIG. 2 schematically shows a single disk polishing apparatus.

FIG. 3 schematically shows a ring polishing apparatus.

FIG. 4 illustrates the material removal performance of various slurry formulations.

FIG. 5 illustrates micro-waviness results of two slurry formulations.

FIG. 6 illustrates low frequency roughness results of two slurry formulations.

FIG. 7 illustrates high frequency RMS roughness (TMS) of two slurry formulations.

FIG. 8 illustrates high frequency roughness (AFM) of two slurry formulations.

DETAILED DESCRIPTION

A slurry and method of polishing a substrate are described. In the following description, numerous specific details are set forth such as specific polishing methods, conditions and formulations. It will be appreciated, however, that these specific details need not be employed to practice the present invention. In other instances, well known methods and apparatuses are not described in detail in order not to obscure unnecessarily the present invention.

The present invention provides a slurry that may comprise an abrasive such as colloidal silica, a chemical group that effectively binds with a constituent of the surface to be polished, and other additives to adjust certain properties of the slurry that will be described in more detail below. Initially, exemplary methods and apparatuses for using a slurry in accordance with the present invention are described.

In one embodiment, the slurry is used to polish a nickel containing layer such as a NiP layer (e.g. approximately 70% Ni, 30% P) plated or deposited onto a substrate (e.g. aluminum or alternative substrate) as part of a magnetic disk manufacturing process. It will be appreciated that polishing processes comprise both chemical and mechanical action. Although the exemplary polishing processes described herein typically utilize both actions to some extent, polishing processes that are primarily chemical or polishing processes that are primarily mechanical may be used in the practice of the present invention. Additionally, it will be appreciated that processes different from those described herein, such as chemical mechanical planarization processes known in the semiconductor wafer processing industry may also be used in the practice of the present invention. Thus, the term polishing as used in the present application is understood to encompass all means of polishing including the foregoing.

In one embodiment, the polishing apparatus is a planetary polisher, such as the SpeedFam 9B-14P polisher or the SpeedFam 11.8B-5P polisher, both available from Speed-Fam International Corporation of Chandler, Ariz. A Diamex β-435 polishing pad, available from Diamex International Corporation, located in Kinnelon, N.J. may be used in the practice of the present invention.

FIGS. 1A and 1B schematically show a planetary polisher 100 including a circular disk carrier 102 which holds disks 104, 106 and 108 during polishing. Although only three disks 104, 106, 108 held by one carrier 102 are shown in FIG. 4, the above-mentioned SpeedFam polisher simultaneously polishes 42 disks held in 14 carriers 102.

During polishing, a gear 110 (the "ring gear") rotates in the direction of arrow A around a central circular member 112 (the "sun-gear"), causing carrier 102 to move around member 112 in a direction B. Simultaneously, central circular member 112 rotates in a direction C, and carrier 102 rotates around its own central axis in direction a D.

Top lap surface 118 rotates opposite to bottom lap surface 116 which simultaneously rub against and polish disks 104, 106 and 108. The slurry is applied to the regions between the lapping pads mounted on surfaces 116 and 118, and disks 104, 106 and 108 via channels 120.

In another embodiment, a single-disk type polisher is used to polish the NiP plated layer. Such a single disk polisher can have a structure similar to the Strasbaugh 6DEDC-25P2 texturing apparatus. FIG. 2 schematically shows a single disk polishing apparatus 130 for polishing a disk 132 with a polishing pad 134. During polishing, disk 132 rotates in a direction E while pad 134 presses against disk 132 and rotates in a direction F. One side of disk 132 is polished at a time. A slurry is introduced between pad 134 and disk 132.

In yet another embodiment, a ring type polisher is used to polish the NiP layer. In one embodiment, the ring type polisher can be an MDS ring polisher available from Speed-Fam.

FIG. 3 schematically shows a ring polisher 160 for polishing disks 162. During polishing, disks 162 are rotated in a direction G by the motion of a center driving ring 164 in direction H. Disks 162 are urged against ring 164 by pivoting stanchions 166. (Pivoting stanchions 166 are mounted to stanchion assemblies 168. During use, stanchions 166 are caused to rotate in direction I by the motion of disks 162.)

During use, while disks 162 are rotated by center driving ring 164, a lower polishing platen 170 presses against disks 162 to thereby polish the lower surface of disks 162. Simultaneously, an upper platen (not shown, but having the same lateral extent as lower platen 170) pushes down on disks 162 to thereby polish the upper surface of disks 162. A slurry is introduced into the space between the platens and disks 162.

After polishing, the NiP is typically textured. After texturing, the magnetic disk is completed by sputtering an underlayer (typically NiP or Cr), a magnetic Co alloy and a hydrogenated carbon overcoat onto the substrate in that order. A liquid lubricant is then deposited onto the carbon. Details concerning these steps are disclosed in U.S. Pat. 5,658,659, issued on Aug. 19, 1997 to Chen et al., incorporated herein by reference.

A slurry in accordance with one embodiment of the invention comprises colloidal silica. To prepare the slurry formulation in accordance with one embodiment of the invention, a commercially available silica slurry such as Compol 80U™ available from Fujimi America, Wilsonville, Oreg. is used. Compol 80U has a silica content of 50% by weight with a mean particle size in the range of approximately 23 through 47 nm. The specific gravity at 25° C. is 1.38. The solution as supplied has pH at 25° C. of 11 and a viscosity of <10 cps. The following formulation includes the Compol 80U to form a slurry in accordance with the present invention:

one part Compol 80U three parts deionized water 0.27 part 30% $H_2O_2$ solution 0.4 part 69% $HNO_3$ solution 1.4 weight % ammonium oxalate monohydrate The ammonium oxalate is such that the weight percentage as a fraction of the total weight of the solution is approximately as stated. It will be appreciated that the formulation described above may be varied without departing from the spirit and scope of the present invention. For example, further dilution up to approximately 5 parts deionized water may be made without significantly affecting the removal rate. The amount of $HNO_3$ may be varied to achieve a desired pH. Typically, the pH is adjusted to be between about 1.5 and 3.5 and preferably greater than 2 for safety reasons. In a preferred embodiment the pH is adjusted to approximately 2.5. In general, the concentration of the various constituents may preferably be varied approximately ±20% from the formulation described above, although formulations outside this range may be used. In addition, lubricants or surfactants may be used to vary the surface characteristics as is well known.

As noted earlier, polishing is a combination of chemical and mechanical action. The friction between the polish pad and the disk surface, together with the grinding action of abrasives, efficiently removes oxide layers that may form on the disk surface, leaving a fresh nickel surface exposed to the slurry. The nickel is then chemically etched in the following redox reactions:

$$Ni \rightarrow Ni^{++} + 2e^- \quad (1)$$

$$2H^+ + 2e^- \rightarrow H_2 \quad (2)$$

The oxidation of the nickel to the $Ni^{++}$ is the anodic reaction and the trapping of electrons by the hydrogen ions provided by the slurry to form hydrogen gas is the cathodic reaction.

Although not wishing to be bound by theory, it is believed that the rate limiting step in removing the nickel layer is the adsorption of $Ni^{++}$ ions on the nickel layer surface. Therefore, even though the vigorous mechanical action of the various polishing methods shown in FIGS. 1–3 may readily bring oxidizers to cause reaction 1 to proceed to the right, and electron acceptors to cause reaction 2 to proceed to the right, the adsorption of nickel ions limits the rate at which these reactions occur.

As is well known, nickel, and other transition elements have a great tendency to form complex ions. Groups bound to such ions are referred to as ligands. According to the well known ligand field theory, ligands of an atom such as nickel form a strong, largely covalent bond with the nickel. Also according to the theory, the central atom and the ligands form molecular orbitals that are derived from the individual bonding orbitals of the central atom (e.g. Ni) and the ligand. The central atom and the ligands form complex structures with the ligands disposed at coordination positions of the structure.

The oxalate portion of ammonium oxalate used in the above described embodiment of the invention comprises two ends having a carbon doubly bound to an oxygen and singly bound to another oxygen each of which is bound to a hydrogen of the ammonia. In solution, a percentage of the ammonium oxalate forms the $C_2O_4^{2-}$ ion with the oxygen singly bound to the carbon not being bound to any other atom. Typically, a group comprising a carbon doubly bound to one oxygen and singly bound to another oxygen that is further bound to a hydrogen atom is referred to as a carboxyl group. For the purposes of the present specification, a group comprising the structure of a carbon doubly bound to one oxygen and singly bound to another oxygen will be referred to a carboxyl group whether the singly bound oxygen is also bound to another atom or group or not. Also for the purposes of the present invention the term carboxyl group encompasses an ion—e.g. a carboxyl group that has a singly bound oxygen not further bound to anything else with the ionic charge associated most closely with the singly bound oxygen.

The carboxyl group is a ligand of nickel and thus can bond to the nickel ion. Because oxalate has two carboxyl groups, the oxalate ion can bridge two coordination positions of the nickel atom. As is well known, any such molecular group that can bond with a metal ion at more than one coordination location is known as a chelating agent.

It is believed therefore that the present invention works by strongly bonding with the $Ni^{++}$ ion with one or more ligands provided by, for example, the oxalate ion. This bonding action causes the $Ni^{++}$ ion to desorb from the surface of the layer being polished so that a fresh surface is exposed for the above described redox reaction followed by chelating as described above. Because the mechanics of the polishing operation quickly provide new reactants and quickly remove reaction products, the nickel redox reactions can proceed much more quickly than in a slurry that does not provide for the forming of strongly bound complexes with the $Ni^{++}$ ions.

When using for example ammonium oxalate, the reactions that occur are as follows:

$$Ni^{++} + C_2O_4^{2-} \rightarrow Ni(C_2O_4) \quad (3)$$

$$Ni^{++} + 2C_2O_4^{2-} \rightarrow Ni(C_2O_4)_2^{2-} \quad (4)$$

$$Ni^{++} + 2NH_3 \rightarrow Ni(NH_3)_2^+ \quad (5)$$

$$H_2O_2 + e^- \rightarrow OH + OH^- \quad (6)$$

The $H_2O_2$ acts as an electron acceptor as shown in reaction 6 to consume electrons generated in reaction 2 so that reaction 2 does not become the rate limiting step. In this regard, it is desirable to add a sufficient amount of $H_2O_2$, or other electron acceptor in the practice of the present invention.

Note that according to equation 5, ammonia, which is present when ammonium oxalate is used in the practice of the present invention, also reacts with nickel. However, it has been found that addition of ammonia alone does not show the marked improvement in nickel removal rate as with ammonium oxalate. Presumably, the ammonia molecule or ammonium ion does not bond as strongly with the adsorbed nickel as a carboxyl group. Furthermore, ammonia is not a chelating agent as is oxalate. Thus, it is believed that in the present invention a ligand that forms a sufficiently strong bond with ions or atoms of a constituent of the surface such that the ions or atoms are no longer adsorbed onto the layer, or a chelating agent of the surface constituent should be used.

In one embodiment, the present invention may be practiced by performing a first polishing step using a slurry comprising an aluminum oxide abrasive having an average particle size of approximately 800 nm. The slurry may be for example a commercially available slurry such as Fujimi DL-3471. To this slurry aluminum nitrate may be added to increase the material removal rate. In one embodiment this first step is carried out on a planetary polisher such as that shown in FIGS. 1A and 1B, as described previously. In one embodiment this step is performed for 160 seconds and removes 80 micro-inches of material.

The advantage of performing this first step is that a large amount of material can be removed quickly and this type of a slurry has good planarizing properties. Additionally, this first step is good at removing plating defects. Following the first step, a second polishing step using a silica slurry in accordance with the present invention is performed.

Typically, this second step is carried out on a planetary polisher such as that shown in FIGS. 1A and 1B as well. Further, in one embodiment the ring gear 110 rotates at 7.6 rpm, the sun gear 112 rotates at 2.3 rpm, the bottom lap surface 116 rotates at 16.5 rpm, and the top lap surface 118 rotates at approximately 5.5 rpm. In one embodiment, a normal loading force in the range of 180–360 kg and preferably approximately 327 kg is used. (The SpeedFam apparatus polishes 42 disks at a time, which means a force of about 7.8 kg/disk is applied.) Larger normal loading forces can be used to improve through-put. It will be appreciated that a separate polishing system is used for the first and second steps to prevent cross contamination of the slurries. The second step is carried out for a time of approximately 200 seconds and removes approximately 20 micro-inches of material. The second step produces a fine and extremely smooth surface with no or very low pits, scratches or other defects.

FIGS. 4–8 illustrate the results obtained with a slurry according to the present invention. In FIGS. 4–8, the slurry 1 represents a slurry based upon Compol 80 U diluted with approximately 3 parts deionized water. Slurry 2 represents a slurry in accordance with the invention of the above-mentioned patent application Ser. No. 08/965,099. The specific slurry 2 comprised one part Compol 80U, three parts deionized water, 0.1 part 30% aluminum nitrate, 0.1 part 30% $H_2O_2$ and 0.04 part 69% $HNO_3$. Slurry 3 is a slurry in accordance with the present invention using the earlier described formula. In slurries 2 and 3 the amount of $HNO_3$ was sufficient to reduce the pH to approximately 2.5. The pH of Slurry 1 was approximately 8 or 9. Referring first to FIG. 4, the removal rate of the various slurries is illustrated. The pair of bars 201 represents the results obtained with slurry 1, the pair of bars 202 illustrates the results of slurry 2, and the bars 203 illustrate the results of slurry 3. The Y axis shows the total removal of material, in micro-inches, for a polish step lasting 300 seconds. For each slurry, the bar on the left shows the total removal, and the bar on the right shows the standard deviation of the thickness removal measurements.

As can be seen, the slurry of the present invention has a 6 times greater material removal rate than the commercial Compol 80 U and nearly a 2 times greater rate than a slurry in accordance with invention described in patent application Ser. No. 08/965,099. Moreover, the standard deviation in measurements as a percentage of the amount of material removed is much lower for the slurry of the present invention.

FIG. 5 shows two pairs of bars 212 and 213 illustrating micro-waviness results with disks polished with slurry 2 and for disks polished with slurry 3. Micro-waviness refers to measurements of average roughness (Ra) using a very low frequency bandpass filter and measuring the value of Ra in the 200–1350 micron wavelength range. As can be seen, the slurry of the present invention provides equal or better performance in terms of micro-waviness than slurry 2.

Bars 222 and 223 of FIG. 6 show low frequency roughness of slurry 2 and slurry 3, respectively. Low frequency roughness measures Ra the wavelength range of 12 through 150 microns. As can be seen, the slurry of the present invention had a low frequency roughness approximately 25% less than slurry 2.

FIG. 7 illustrates the high frequency roughness of slurry 2 and slurry 3 with bar pairs 232 and 233, respectively. High frequency roughness is a measurement of RMS roughness with a wavelength in the range of 0.7 microns through 30 microns, and is measured using light scattering interferometry. As can be seen, the high frequency roughness for the present invention is approximately equal to that of slurry 2.

FIG. 8 illustrates high frequency roughness as measured by an atomic force microscope (AFM). Bars 242 represent the results for slurry 2, and bars 243 represent the results for slurry 3. As can be seen, the AFM high frequency roughness of the slurry in accordance with the present invention is slightly lower than that for slurry 2.

As can be seen in FIGS. 5–8, a slurry in accordance with the present invention showed equal or better results with respect to the surface roughness of the polished disks compared with the slurry in accordance with the invention described in U.S. patent application Ser. No. 08/965,099. In addition, the observed surface condition in terms of scratches and pits is better than that obtained with the aforementioned slurry. However, as shown in FIG. 4, the slurry of the present invention provides a considerably improved removal rate. The improved removal rate translates into numerous benefits including better (reduced) through-put time which reduces the cost of the process step in terms of fixed cost per unit of production and additionally in terms of reduced slurry usage per unit of production. In addition, ammonium oxalate, for example is a less expensive material than aluminum nitrate, further increasing cost savings. For example, to obtain the amount of material removal as the above described slurry 2, a method using the slurry according to the present invention has a polish time that is over 30% shorter, so that the volume of slurry per batch of wafers is approximately 30% less. In addition, because of the above noted material cost difference, the unit cost of the slurry is approximately 12% less for the slurry of the present invention. As a result, the cost per disk is reduced by about 40% compared to slurry 2.

Although the results of FIGS. 4–8 illustrate a specific embodiment using ammonium oxalate, other materials may be used in the practice of the present invention. As described earlier, it is believed that the ammonium oxalate provides the improvement in material removal rate by providing a ligand that bonds strongly with nickel and moreover is a chelating agent of nickel i.e. bonds with Ni at two positions. In this regard, other ligands which bond strongly with nickel and other chelating agents may be used. In particular, other dicarboxylates other than oxalate such as malonate, succinate, maleate and phthalate may be used. These compounds may be supplied in the form of ammonium oxalate, ammonium malonate, etc. or may be in the form of other salts or compounds. For example, such materials may be supplied as organic acids including carboxylic acids such as oxalic acid, although the efficacy of such may be reduced by limited dissociation in low pH solutions.

It will further be appreciated that the ligand or chelating agent may be used in combination with virtually any type of slurry, including those described in U.S. patent application Ser. No. 08/965,099. In this regard, it will be appreciated that a slurry in accordance with the present invention may use a lesser amount of aluminum nitrate than described in the preferred embodiments described therein, while achieving very high removal rates. A lower amount of aluminum nitrate may be beneficial, as aluminum nitrate has a tendency to cause pitting.

It will be appreciated that because the slurry of the present invention provides relatively high material removal rate, a single step process utilizing the slurry of the present invention may be utilized immediately after nickel plating or deposition, without the need to perform the above described first step if desired. In one embodiment the gear 110 rotates at a speed of 3.0 rpm, the gear 112 rotates at a speed of 11.4 rpm, and the plate 102 rotates at a speed of 26.4 rpm. In one embodiment, a normal loading force of approximately 360 kg is used. The process was performed for a time of 600 seconds and achieved a removal rate of approximately 8.5 micro-inches per minute. The average microwaviness achieved was 5.2 Å, the low frequency roughness was 3.5 Å, the high frequency TMS roughness was 1.93 Å, and the high frequency AFM roughness was 0.30 Å.

While the invention has been described with respect to specific embodiments thereof, those skilled in the art will recognize that changes can be made in form and detail without departing from the spirit and scope of the invention. For example, as mentioned above, various ligand or chelating agents may be used to increase the material removal rate. In this regard, one of skill in the art will appreciate that the specific ligand(s) or chelating agent(s) to be used should form a sufficiently strong bond with the metal to be removed from the surface to cause the desorption of adsorbed ions. The invention may be used in slurries having additional or different abrasives such as fumed silica or alumina. Accordingly, all such embodiments come within the scope of the present invention.

What is claimed is:

1. A slurry for polishing a surface comprising:
   a liquid phase;
   an abrasive comprising silica; and
   a species comprising a ligand of an element contained in said surface, said ligand being bonded with an ion or atom of said element, to create a bond sufficiently strong to remove an adsorbed ion or atom of said element from said surface.

2. The slurry as described in claim 1 wherein said liquid phase is aqueous.

3. The slurry as described in claim 1 wherein said element is nickel and wherein said ligand comprises a carboxyl group.

4. The slurry as described in claim 3 wherein said species comprises a dicarboxylate.

5. The slurry as described in claim 4 wherein said dicarboxylate is selected from the group consisting of oxalate, malonate, succinate, maleate, and phthalate.

6. A slurry for polishing a surface comprising:
   a liquid phase;
   an abrasive;
   a species comprising a ligand of an element contained in said surface, said ligand being bondable with an ion or atom of said element to create a bond sufficiently strong to remove an adsorbed ion or atom of said element from said surface; and, an electron acceptor.

7. The slurry as described in claim 6 wherein said electron acceptor comprises $H_2O_2$.

8. A method of polishing a surface of a substrate comprising
   polishing said surface in a slurry, said method comprising:
      providing a slurry, said slurry comprising:
         a liquid phase;
         an abrasive comprising silica; and
         a species comprising a ligand of an element contained in said surface, said ligand being bonded with an ion or atom of said element, to create a bond sufficiently strong to remove said adsorbed ion or atom from said surface; and polishing said surface using said slurry.

9. The method as described in claim 8 wherein said element is nickel and wherein said ligand comprises a carboxyl group.

10. The method as described in claim 8 wherein said species comprises a dicarboxylate.

11. The method as described in claim 10 wherein said dicarboxylate is selected from the group consisting of oxalate, malonate, succinate, maleate, and phthalate.

12. A slurry for polishing a surface comprising:
    a liquid phase;
    an abrasive comprising silica; and
    a species comprising a chelating agent of an element contained in said surface.

13. The slurry as described in claim 12 wherein said liquid phase is aqueous.

14. The slurry as described in claim 13 wherein said element is nickel and wherein said chelating agent comprises a dicarboxylate.

15. The slurry as described in claim 14 wherein said dicarboxylate is selected from the group consisting of oxalate, malonate, succinate, maleate, and phthalate.

16. A method for polishing a surface of a substrate comprising
    polishing said surface in a slurry, said method comprising:
       providing a slurry, said slurry comprising:
          a liquid phase;
          an abrasive comprising silica; and
          a species comprising a chelating agent of an element contained in said surface; and,
       polishing said surface using said slurry.

17. The slurry as described in claim 16 wherein said liquid phase is aqueous.

18. The slurry as described in claim 17 wherein said element is nickel and wherein said chelating agent comprises a dicarboxylate group.

19. The slurry as described in claim 18 wherein said dicarboxylate is selected from the group consisting of oxalate, malonate, succinate, maleate, and phthalate.

20. A slurry for polishing a surface comprising:
    a liquid phase;
    an abrasive comprising silica; and
    ammonium oxalate.

21. A method for polishing a surface of a substrate comprising polishing said surface in a slurry, said method comprising:
    providing a slurry, said slurry comprising:
       a liquid phase;
       an abrasive comprising silica; and
       ammonium oxalate; and,
    polishing said surface using said slurry.

22. The method as described in claim 21 wherein said surface comprises nickel.

23. A slurry for polishing a surface comprising:
    a liquid phase;
    an abrasive;
    a species comprising a chelating agent of an element contained in said surface; and,
    an electron acceptor.

24. The slurry as described in claim 23 wherein said electron acceptor comprises $H_2O_2$.

* * * * *